March 11, 1958  R. C. TURTLE  2,826,084
TRANSMISSION MECHANISM
Filed April 12, 1954  4 Sheets-Sheet 1
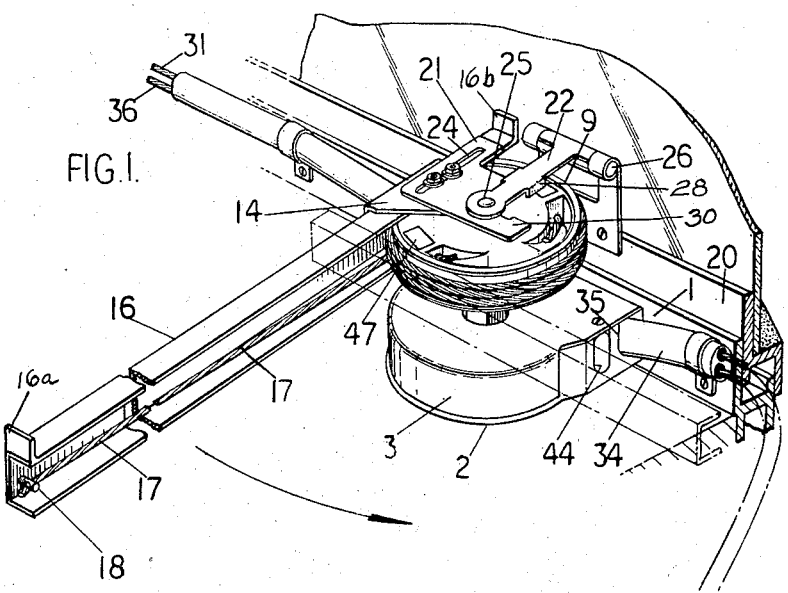
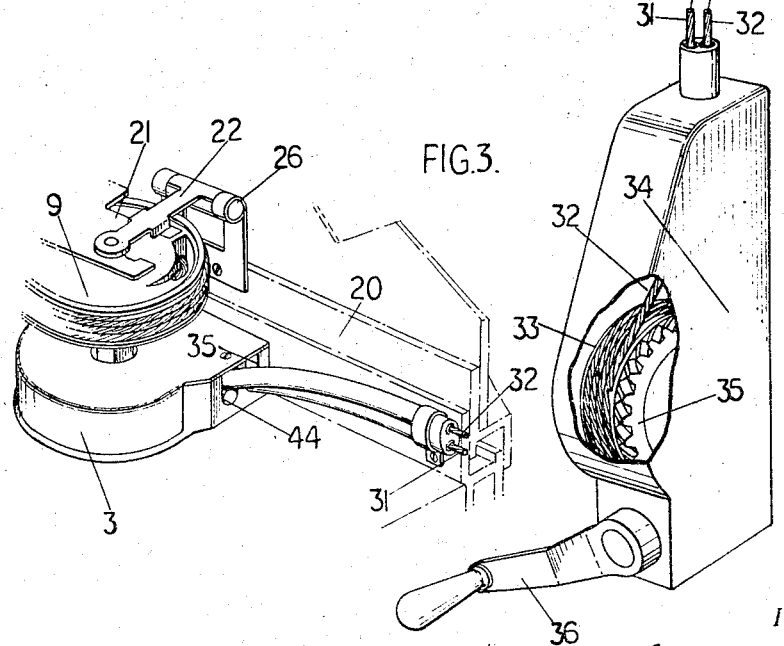
Inventor
Rupert Clifford Turtle
By Pierce, Scheffler & Parker
Attorneys

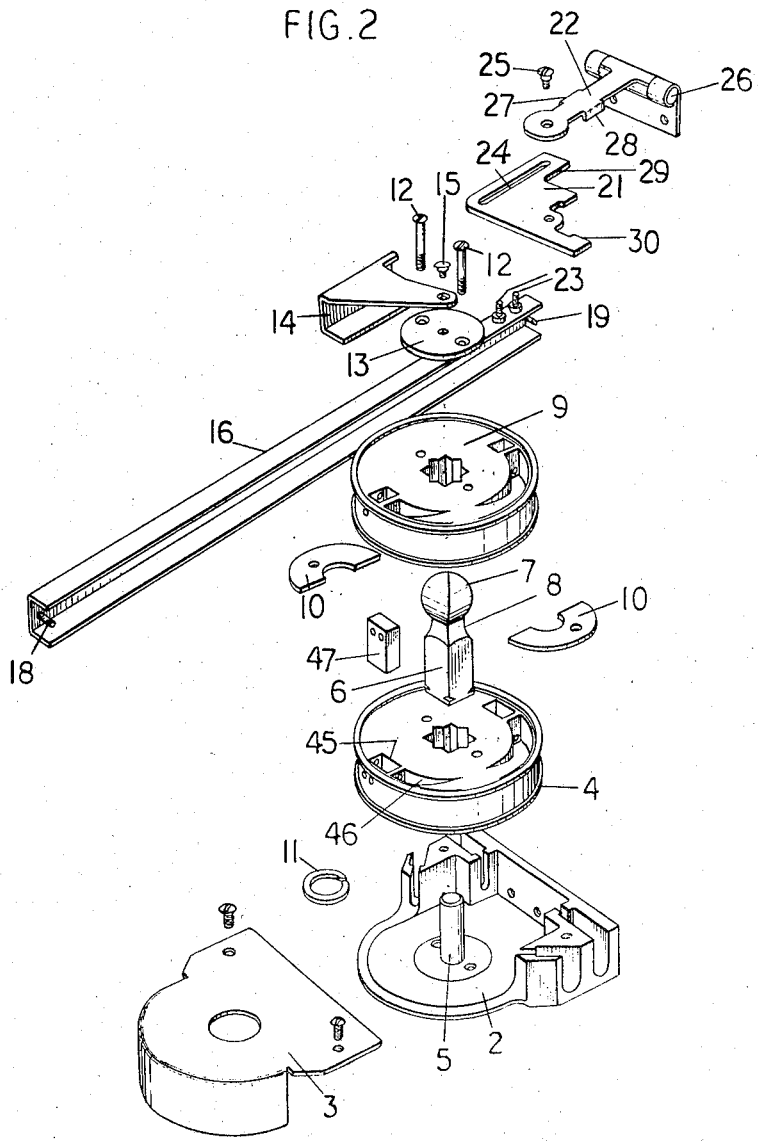

March 11, 1958 R. C. TURTLE 2,826,084
TRANSMISSION MECHANISM
Filed April 12, 1954 4 Sheets-Sheet 3
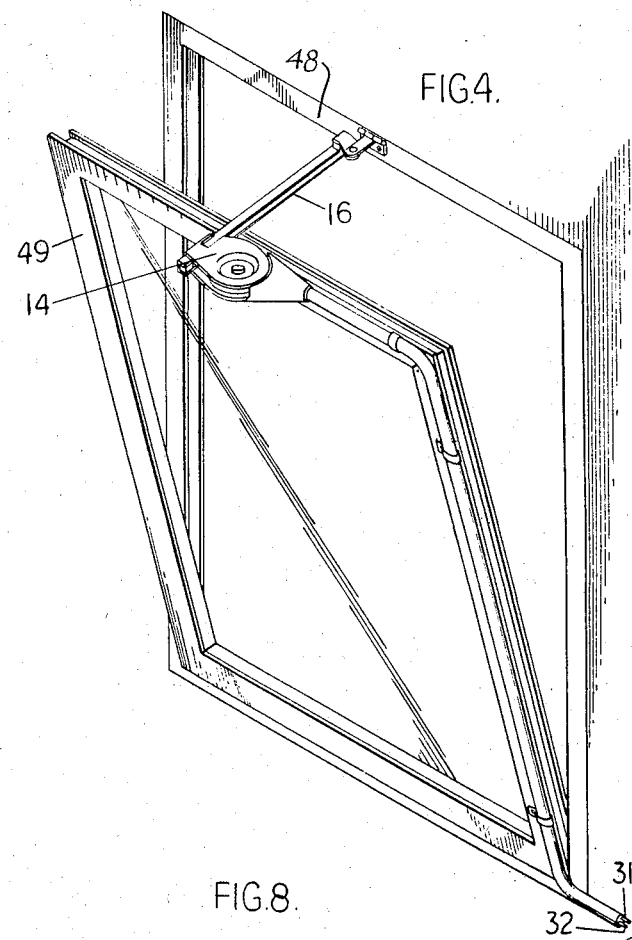
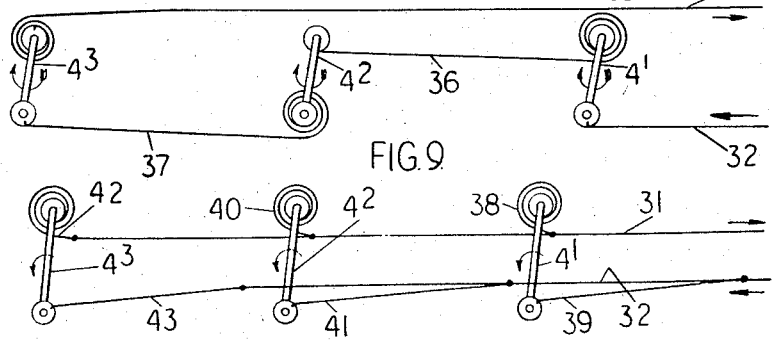
Inventor
Rupert Clifford Turtle
By
Pierce, Scheffler & Parker
Attorneys March 11, 1958 R. C. TURTLE 2,826,084
TRANSMISSION MECHANISM
Filed April 12, 1954 4 Sheets-Sheet 4
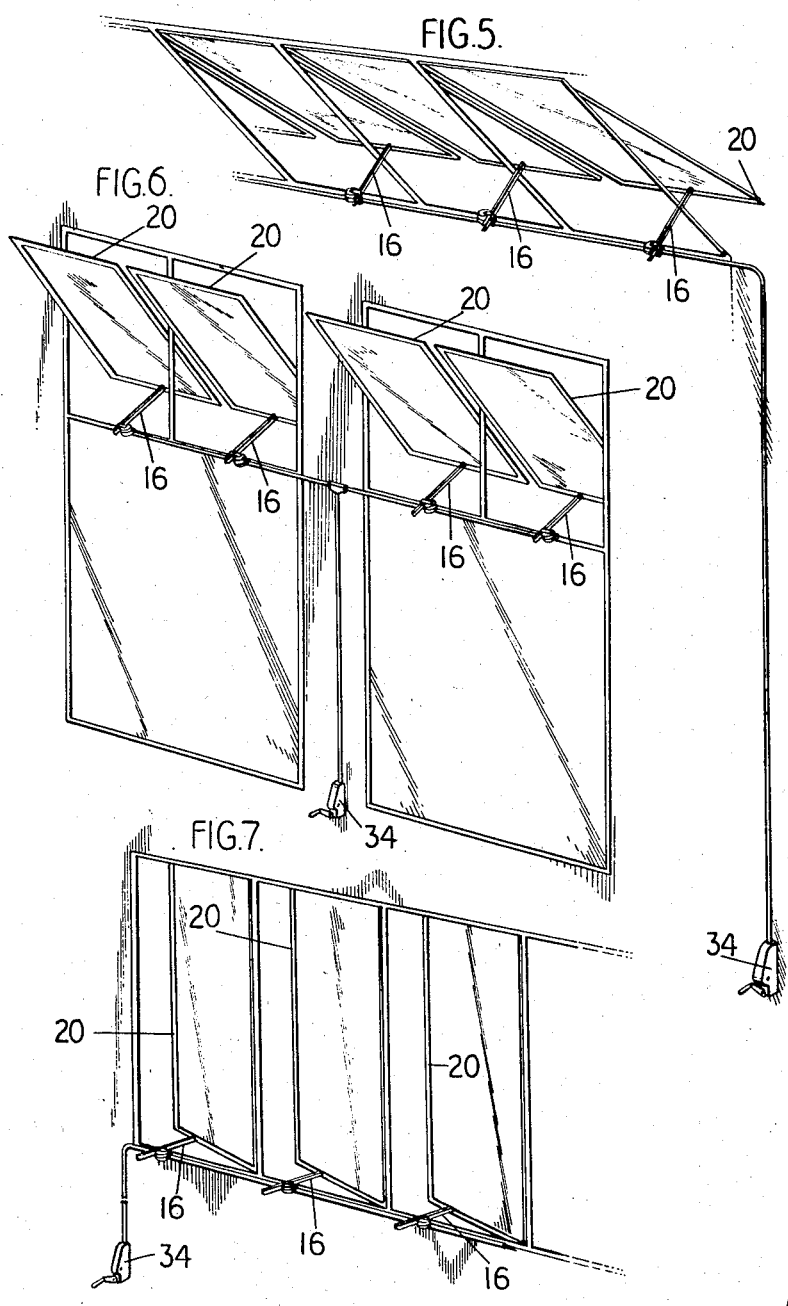

United States Patent Office

2,826,084
Patented Mar. 11, 1958

2,826,084

TRANSMISSION MECHANISM

Rupert Clifford Turtle, South Croydon, England, assignor to Arens Controls Limited, East Croydon, England, a British company Application April 12, 1954, Serial No. 422,638

Claims priority, application Great Britain April 13, 1953

21 Claims. (Cl. 74—95)

This invention is concerned with improvements in or relating to transmission mechanism and has for its object to provide simple and efficient mechanism, with the aid of which it is possible to impart reciprocating movement and rotary movement to a driven member pursuant to the rotation of a driving member.

According to the present invention there is provided control mechanism comprising a pivotally mounted carriage, a bar or the like mounted for longitudinal reciprocation with respect to said carriage, a driving element mounted for rotation about an axis concentric with the pivotal axis of said carriage and having driving engagement with said bar or the like for effecting relative reciprocation between the said bar and carriage and means for preventing pivotal movement of said carriage excepting when said bar or the like is in or closely adjacent to a predetermined position within its range of longitudinal reciprocating movement with respect to the said carriage and for preventing relative reciprocation of said bar or the like with respect to said carriage excepting when the latter is in or closely adjacent to a predetermined position within its range of pivotal movement, the arrangement being such that pursuant to rotation of said driving element the carriage and bar assembly can be swung about the pivotal axis of the carriage only so long as the bar or the like is in or closely adjacent to the first-mentioned pre-determined position whilst there can be relative reciprocation between the said bar and carriage only so long as the carriage is in or closely adjacent to the second-mentioned pre-determined position.

The aforesaid carriage may be so mounted that it always lies in a single plane in which case the said bar or the like will also be disposed for reciprocation in a single plane. It is however also within the scope of the present invention to mount the said carriage for limited rocking movement so that the said bar or the like can also rock and thereby afford accommodation for movements imposed for instance as a result of said bar being employed for actuating an angularly moveable member. Provision for such limited rocking movement may, for instance, be afforded by coupling said driving element to a driving spindle or the like through a universal coupling.

The driving engagement between the aforesaid driving element and the reciprocating bar or the like may be of various forms, e. g. the bar may be provided with rack teeth for engagement by a suitably toothed driving element. We at present prefer however to provide a driving element in the form of a pulley in conjunction with a flexible cable which is wound around said pulley and has its respective ends anchored to opposite ends of the said bar or the like. In all cases rotation of the driving said bar or the like. In all cases rotation of the driving element, assuming that the angular position of the carriage is such as to permit of relative sliding movement of the bar or the like, will cause relative sliding movement between such bar or the like and the carriage in one direction or the opposite direction dependent upon the direction of rotation of the said driving element, the limits of such sliding movement being defined in any convenient way, e. g. by means of stops located on the bar or the like, for cooperation with the carriage.

The means for preventing pivotal movement of the carriage and bar assembly excepting when the bar or the like is in its predetermined position with respect to the carriage may be of various different kinds. We prefer however to employ a bracket secured to or formed integrally with the said bar in conjunction with a link member coupled to said bracket in a manner permitting pivotal movement about an axis parallel to the pivotal axis of the carriage, the said link member being adapted to be coupled to the member to be actuated by the transmission mechanism, and the pivotal mounting of the link being so located that when the bar or the like is in the earlier mentioned pre-determined position, i. e. the position in which it is desired there should be freedom for pivotal movement, such axis is concentric with the pivotal axis of the carriage. It will be understood that in this arrangement providing the timing is such that the bar or the like reaches the limit of its relative sliding movement in one direction at the same time as the pivotal axis of the link member and the pivotal axis of the carriage are concentrically disposed continued rotation of the driving element in the same direction as that in which it was turned to slide the bar or the like to that position will transmit rotary movement to the carriage, bar and bracket about the axially aligned pivotal mountings of the link on the one hand and the carriage and bar on the other hand. Assuming, now, that the link is by virtue of its mounting restrained for sliding movement in one direction only it will be understood that once the bar or the like turns out of the line of movement of the link, such bar or the like is prevented from sliding with respect to its carriage and movement of the driving element can only swing the carriage and bar assembly around its pivotal axis. When such assembly is swung back to a position in which the bar or the like is parallel to the said link then continued rotation of the driving element will exert not only a tendency to swing such assembly still further but also a tendency to cause relative sliding movement between the bar or the like and the carriage and as a stop is provided for ensuring that the bar or the like cannot move beyond that position the result is that continued movement of the driving element generates the said sliding movement. Once there is relative sliding movement between such bar or the like and its carriage the pivotal axis of the said bracket moves out of alignment with the pivotal axis of the carriage and pivotal movement of the carriage and bar is in any event then prevented.

The driving element of transmission mechanism according to the present invention may be actuated directly or indirectly by any suitable means, e. g. by a winch or other rotary member coupled by means of flexible cables or the like to the said driving element or to a pulley or the like coupled thereto.

Mechanism in accordance with the present invention may be employed for operating a wide variety of devices or other mechanisms, but it is particularly intended for operating windows, louvres, doors, dampers or the like and in such applications the aforesaid bar or the like may constitute the equivalent of a window-stay and the dual movement provided by the said transmission mechanism enables the stay and carriage to be moved not only linearly with respect to one another for effecting opening and closing movement but also angularly for enabling such stay to be nested in a plane parallel to that of the controlled member when the latter is closed. It will be appreciated in the latter respect that in the case for instance of pivoted windows adapted for remote control there would be objections to the stays of such windows projecting at right-angles into a room when the windows are closed, for instance on the grounds of unsightliness or interference with the movement of curtains.

In cases where transmission mechanism according to the present invention is applied to windows the latter may be of the kind which pivot about a vertical axis as well as those which pivot about a horizontal axis, and in the latter case the window may be of the top-hung kind for outward opening or of the bottom-hung kind for inward opening. If the window is of the top-hung kind then during opening and shutting movements the carriage will be mounted on a fixed part of the window and the bar will slide with respect thereto, and in the case of bottom-hung windows the carriage will be mounted on the movable part of the window and will slide with respect to the bar, the latter being mounted on a fixed part of such window.

In order that the present invention may be well understood some embodiments thereof will now be described, by way of example only, and with reference to the accompanying drawings in which:

Figure 1 is a broken perspective view showing one arrangement for operating a series of top-hung fan-light windows, one of the associated windows and window frames being shown in broken condition and part of the driving winch being broken away to expose internal parts.

Figure 2 is an exploded view of the transmission mechanism shown in Figure 1.

Figure 3 shows mechanism similar to that shown in the earlier figures but modified very slightly for operating a single window.

Figure 4 shows how mechanism similar to that shown in the earlier figures may be applied to a bottom-hung window.

Figure 5 shows diagrammatically the application of control mechanism according to the present invention to a series of top-hung windows.

Figure 6 shows diagrammatically the application of control mechanism according to the present invention to a series of windows pivotable about horizontal axes located intermediate the ends of the windows, Figure 7 shows diagrammatically the application of control mechanism according to the present invention to a series of windows pivotable about vertical axes.

Figure 8 shows diagrammatically one method in which the driving elements of a series of units may be actuated by an operating winch, and Figure 9 shows diagrammatically another way in which such series of operating elements may be actuated.

Referring to Figures 1 and 2, the operating unit is secured to the base of the window frame 1 and comprises a casing having a base 2 and cover 3 housing a pulley 4 which is rotatable about a spindle 5 upstanding from said base 2, there being a bearing member 6 located between the said spindle 5 and the bore of the pulley 4. This bearing member has an axial bore for receiving the said spindle and its body portion is of square cross-section for keying engagement by the bore of the pulley 4, the said bore being preferably contoured in the manner shown in Figure 2 so that the pulley can be fixed to the spindle in various angular positions. The upper end of the said bearing member has a head portion 7 surmounting a reduced portion 8, the said head portion being rounded as shown into the form of what may be called a squared ball for engagement by the bore of a pulley 9 which is similar to the pulley 4, the said pulley 9 constituting the driving element of the unit.

By the above construction the pulleys 4 and 9 can be adjusted on the bearing member 6 through 45° and by virtue of the contouring of the aforesaid head portion 7 the pulley 9 whilst being mounted on such member in a non-rotatable manner can nevertheless undergo some rocking movement with respect thereto.

The pulley 9 may be secured to the bearing member 6 by means of a split washer 10 and the said bearing member may be secured to the spindle 5 by means of a circlip 11 or in any other convenient manner, it being desirable to prevent any inadvertent axial separation of these parts. If desired the split washer 10 may locate both pulleys in position, e. g. screws 12, 12 may pass through both pulleys and through holes in the two parts of the washer.

A disc 13 is secured to the centre position of the top of the aforesaid pulley 9, such disc being conveniently secured by means of the aforesaid screws 12, 12.

A carriage 14 is secured to the aforesaid disc 13 by means of a stud 15 which passes through an opening in the carriage into a screw-threaded hole in the said disc, such hole being concentric with the axis of the spindle 5.

The aforesaid carriage 14 extends as shown from the upper surface of the pulley 9 around the side of such pulley and then partially under the lower surface of such pulley to form a channel-like guideway for slidably receiving a bar 16, the said bar constituting the window stay and being of channel section with the open side presented towards the pulley 9. The said channel-sectioned bar 16 extends over the upper and lower faces of the pulley 9 and its vertical face is spaced from the periphery of the pulley to an extent appropriate for receiving a cable drive. The said cable drive comprises a cable 17 which is anchored at one end to a stud 18 at the forward end of the stay 16 and thence passes in two or three convolutions around the pulley 9 and its opposite end is anchored to a stud 19 (see Figure 2) at the rear end of the stay 16. As an alternative to the use of a single cable 16 two separate cables may of course be employed one extending from the stud 18 to an anchorage on the pulley and the other extending from the stud 19 also to an anchorage on the pulley, said cables being wound around the pulley in opposite directions. In both cases the arrangement is such that pursuant to rotation of the pulley the cable ends anchored to the stay are respectively payed out and taken up so resulting in sliding movements of the stay, assuming that the mechanism is in a condition for such sliding movement being possible. Lugs 16a and 16b cooperate with the carriage 14 to provide stop means for defining the limits of longitudinal sliding movement of the stay 16 within the carriage.

The aforesaid stay 16 is connected to the movable sash part 20 of the window by means of a bracket 21 and link 22. The bracket 21 is fixedly attached to the stay 16 for instance by two screwed studs 23, 23, and if desired these studs may pass through a slot 24 in the bracket 21 so that the position of the bracket can be adjusted with respect to the stay. The bracket 21 is pivotally connected to the link 22 by means of a stud 25, with the result that the said bracket can swing about an axis parallel to that of the axis of the pulley 9 and the link itself is pivotable with respect to the window about the pin 26, i. e., about an axis parallel to that of the pivotal axis of the window itself.

The pivotal connection 25 between the bracket 21 and the link 22 is so located that when the stay is fully retracted that connection is coaxial with the axis of the driving pulley 9, i. e. when the window is fully closed the driving pulley 9, bracket 21, carriage 14 and stay 16 are free to swing in unison about the axis of the said pulley. It will be understood however that when the stay 16 moves from its fully retracted position, i. e., when the window is opened, the pivotal connection of the bracket 21 is no longer coaxial with the pulley and the said angular movement of the stay is prevented.

The aforesaid bracket 21 cooperates with the link 22 in such a way that the stay and carriage assembly can swing in one direction only to a position in which the bar 16 is parallel to the link and the other direction only to a position in which it is at right-angles or at an angle slightly greater than a right-angle to such link, i. e. the stay can be swung into a nested position in which it is parallel to or slightly inwardly directed with respect to the windows and into a position in which it extends at right-angles to the window. For the purpose of defining these limiting positions lugs 27 and 28 may extend downwardly from the link 22 for cooperation with abutment faces 29 and 30 formed on the bracket 21.

The operation of the mechanism so far described is as follows:

When the stay 16 is parallel to the link 22 rotation of the driving pulley 9 causes reciprocation of the stay and resultant opening and closing of the window 20, and no rotation of the stay and carriage as a unit is possible so long as the pivotal axis between the aforesaid bracket 21 and link 22 is spaced from the pivotal axis of the said carriage 14. When however the stay 16 is fully retracted, i. e. the window is fully closed, then the aligning of the aforesaid axes is attained and continued rotation of the driving pulley 9 in the same direction will swing the stay 16, carriage 14 and bracket 21 into a position in which the stay 16 lies parallel to or slightly re-entrant with respect to the window and the abutment 30 on the bracket comes against the lug 28 on the link. During the said swinging movement no sliding movement of the stay 16 with respect to its carriage 14 is possible owing to the link itself not being movable in a direction transverse with respect to that in which the window swings.

On reverse rotation of the driving pulley 9 the carriage and stay assembly will be caused to swing into alignment with the above mentioned link 22 whereupon further angular movement will be arrested by abutment of the surface 29 of the bracket against the lug 27 of the link 22, and continued rotation of the said pulley will slide the stay in a window-opening direction. It will be understood in this respect that the rockable mounting of the pulley and carriage assembly and the mounting of the aforesaid link for pivotal movement about an axis parallel to that of the window hinge will provide accommodation for the arcuate movement of the window itself.

The aforesaid driving pulley 9 may of course be rotated by any suitable means but in the arrangement shown in Figures 1 and 2 of the drawings such rotation is effected by means of two cables 31 and 32 each of which is anchored at one end to the drum 33 of a winch unit 34, said drum having a worm wheel 35 formed integrally therewith or secured thereto for cooperation with a worm actuated by a crank handle 36. These cable ends are wound around the drum 33 in opposite directions, so that rotation of the drum results in one cable being payed out and the other being drawn in, the position shown in Figure 1 corresponding to that in which cable 32 is fully drawn in and the cable 31 is fully payed out.

The other ends of the cables 31 and 32 are both connected to the pulley 4 if only a single window stay is to be operated but if a series of window stays are to be operated then one only of such cable ends may be connected to the pulley 4 of the first unit and the other cable end may be connected to the corresponding pulley of the last of the series of units and further cables may interconnect the pulleys of the intermediate unit. In the arrangement shown in Figure 1 it is assumed that there is a further unit to be operated and both of the cables 31 and 32 and their common housing 34 are shown entering the hole 35 in the casing 3, the cable 32 being anchored to the drum 4 and the cable 31 passing to the corresponding pulley of the next unit. The cable 31 upon being wound in by the winch positively rotates the pulley to which its other end is secured pursuant to the convolutions of that cable being drawn therefrom and rotation of that pulley results in a further cable 36 being drawn in and thereby positively rotating the drum 4. On reverse rotation of the winch the cable 32 is wound in by the winch and the pulley 4 is thus positively driven in the opposite direction.

The principle involved in this operation of a series of units can be seen in the diagrammatic arrangement shown in Figure 8 where there are three units, the equivalents of the aforesaid pulley 4, being designated $4^1$, $4^2$ and $4^3$ and the cables associated with the first drum $4^1$ having the same reference numerals as in Figure 1. It will be seen that the cable 31 by-passes pulleys $4^1$ and $4^2$ and when fully payed out by the winch is fully taken up on pulley $4^3$, whilst the cable 32 is anchored to pulley $4^1$ and is fully withdrawn from that pulley and fully wound into the winch when cable 31 is fully payed out. A second cable 36 extends between the drums $4^1$ and $4^2$ to which its ends are anchored and in the said condition this cable is unwound from pulley $4^2$ and wound onto pulley $4^1$. A further cable 37 couples the pulleys $4^2$ and $4^3$ to which its ends are anchored, such cable in the condition stated being unwound from pulley $4^3$ and wound on pulley $4^2$. It will be understood therefore that a pull on cable 31 in the direction of the arrow shown in Figure 8 results in pulley $4^3$ being positively rotated in a clockwise direction, this rotation exerts a pull on the cable 37 which causes positive rotation of pulley $4^2$ also in a clockwise direction and rotation of that pulley exerts a pull on cable 36 so causing positive rotation of pulley $4^1$ also in a clockwise direction and cable 32 will be wound upon pulley $4^1$ as it is payed out by the winch in the direction of the arrow shown in Figure 8. Reverse rotation of the winch will impart positive anti-clockwise rotation to all of the drums.

An alternative method of attaining ganged operation of a number of units is shown in Figure 9 and this might be called a shunt operation as opposed to the already described operation which is in the nature of a series control. In this alternative method the cables 31 and 32 extending from the winch are coupled to the various drums, of which three are shown and identified by the references used in Figure 8, by separate pairs of cables, i. e. cables 31 and 32 are coupled to pulley $4^1$ by cables 38 and 39, to pulley $4^2$ by cables 40 and 41, and to pulley $4^3$ by cables 42 and 43 although it will be clear that the cables coupled to the last pulley of the series may indeed be the ends of the cables 31 and 32 themselves.

In cases where only a single unit is to be actuated then the aforesaid cables 31 and 32 are of course connected to the single pulley 4. Such an arrangement is shown in Figure 3 of the drawings where reference numerals similar to those used in Figure 1 are employed and in order to promote a smooth lead-in of the cable 32 this preferably passes through a second hole 44 in the casing 3.

It will of course be understood that for the purpose of anchoring the aforesaid cables to their associated pulleys any suitable means may be adopted. It is at present desired however to thread the ends of the cables through apertures in the periphery of each pulley into a housing 45 and thence into a recess 46, the housing 45 being adapted to receive a wedging element 47 which can be driven into locking position and secured for instance by set screws.

Figure 4 shows the application of the present invention to a bottom-hung window and in such an arrangement it will be appreciated that the stay 16 has to be pivotally mounted on the stationary part 48 of the window, whilst the carriage assembly 14 has to be mounted on the movable part 49 of such window. It is further necessary for the housing for the operating cables 31 and 32 to be disposed in an appropriately flexible housing 50 to accommodate the swinging movement of the control unit.

Figure 5 of the drawings shows diagrammatically a complete assembly incorporating a series of top hung windows actuated by the mechanism shown in Figures 1 and 2. It will be readily appreciated however that the winch control 34 may be located between groups of windows to be actuated, for instance as shown in Figure 6 where similar references are employed to designate corresponding parts of the mechanism. In this figure there is an additional change in that the windows 20 are pivotable about central axes.

Figure 7 shows diagrammatically the application of the above described control mechanism to windows which are pivotable about vertical axes and similar reference numerals are again employed for corresponding parts.

Whilst some embodiments of the present invention have been hereinbefore described it is to be understood that there may be various changes without departing from the scope of such invention. Thus for instance there may be various changes in the stops employed for limiting the aforesaid angular and sliding movements of the bar or the like and there may be many changes in the particular way in which the bar or the like is mounted subject always to this mounting being such that only in one angular position of the bar or the like is relative sliding movement generated between the carriage and the bar or the like pursuant to rotation of the driving element and in only one position of the said sliding movement is angular movement of the bar or the like generated pursuant to rotation of the said driving element.

I claim:

1. A control mechanism comprising a frame, a carriage pivotally secured to said frame, a stay longitudinally movable within said carriage in a plane perpendicular to the pivot axis of said carriage, a driving element mounted for rotation about an axis concentric with the pivotal axis of said carriage, a driving connection between said driving element and said stay for effecting reciprocation of said stay with respect to said carriage and also for effecting pivotal movements of said carriage and stay, and means for preventing pivotal movement of said carriage and stay except when said stay is at a predetermined position within its range of longitudinal reciprocatory movement with respect to the said carriage and for preventing reciprocation of said stay with respect to said carriage except when the latter is at a predetermined position within its range of pivotal movement, the arrangement being such that pursuant to rotation of said driving element said carriage and stay can be swung about the pivotal axis of said carriage only so long as said stay is in said first-mentioned pre-determined position and relative reciprocation between said carriage and said stay can be effected only so long as said carriage is in said second-mentioned pre-determined position.

2. Control mechanism as defined in claim 1 wherein said carriage is mounted for limited rocking movement.

3. Control mechanism as defined in claim 1 wherein said driving element is constituted by a pulley and said driving connection between said pulley and stay comprises a cable drive.

4. Control mechanism as defined in claim 3 wherein said cable drive comprises two cables, one of said cables being anchored at one end to one end of said stay and at its other end to said pulley, the other of said cables having one end secured to the other end of said stay and the other end secured to said pulley, said two cables being wrapped about said pulley in opposite directions whereby rotation of said pulley in opposite directions effects movement of said stay in opposite directions, respectively.

5. Control mechanism as defined in claim 1 and which further includes stops limiting the range of longitudinal movement between said carriage and stay.

6. Control mechanism as defined in claim 1 wherein said means for preventing pivotal movement of said carriage and stay excepting when said stay occupies a predetermined position with respect to said carriage comprises a bracket on said stay in conjunction with a link member pivotally connected to said bracket that permits of pivotal movement of said bracket about an axis parallel to the pivotal axis of said carriage, the arrangement being such that when said stay reaches the end of its longitudinal movement in one direction the pivotal axis of said link and bracket and the pivotal axis of said carriage reach positions of concentricity with the result that continued rotation of said driving element in the same direction as that which brought about those conditions will transmit rotary movement to the assembly comprising said stay, carriage and bracket, and when said stay and bracket are moved in the opposite direction away from said condition of concentricity rotation of said driving element causes longitudinal movement of said stay.

7. Control mechanism as defined in claim 1 and which further includes stops defining the limits of angular movement of said stay and carriage.

8. Control mechanism as defined in claim 7 wherein said stops are so disposed as to allow said stay to swing to a position in which it extends at 90° with respect to a member to be controlled by the mechanism and also to a position in which it lies substantially parallel with respect to the controlled member.

9. Control mechanism as defined in claim 1 and which further includes a cable mechanism for rotating said driving element.

10. Control mechanism as defined in claim 1 and which further includes a driving means for rotating said driving element, said driving means comprising a winch in conjunction with cable mechanism extending therefrom to a pulley connected with said driving element.

11. Control mechanism as defined in claim 1 and which further includes a driving means for rotating said driving element, said driving means comprising a winch drum in conjunction with cable mechanism incorporating at least two cables, one end of each cable being anchored to said winch drum for winding around the same in opposite directions, the other end of one of said cables being anchored to said driving element and the other end of said other cable also being anchored to said driving element or to another rotary element coupled by one or more additional cables to said driving element.

12. Control mechanism as defined in claim 1 in combination with a pivoted member such as a window to be actuated by said mechanism.

13. Control mechanism as defined in claim 1 in combination with a pivotally mounted member such as a window to be actuated thereby and a frame for said member, said pivotally mounted member being disposed for pivotal movement about an axis at the top thereof, said stay being pivotally connected to said member and said carriage and driving element being mounted on said frame.

14. Control mechanism as defined in claim 1 in combination with a pivotally mounted member such as a window to be actuated thereby and a frame for said window member, said window member being disposed for inward swinging movement about an axis at the bottom thereof, said carriage and driving element being mounted on said window member and said stay being pivotally connected to said frame.

15. A plurality of control mechanisms each as defined in claim 1 in combination with a single device for collectively actuating said mechanisms.

16. A plurality of control mechanisms each as defined in claim 1 in combination with a single device for collectively actuating said mechanisms, said device comprising two main operating cables, one end of each cable being coupled to means for applying a pull thereto, the other end of each cable being coupled to the driving element of one of said control mechanisms and the driving elements of the other control mechanisms being coupled to said cables, the arrangement being such that a pull on one of said cables effects rotation of the driving elements of all said mechanisms in one direction or the other dependent upon the direction of pull.

17. A plurality of control mechanisms each as defined in claim 1 in combination with a single device for collectively actuating said mechanisms, said device comprising two main operating cables, one end of each cable being coupled to means for applying a pull thereto, the opposite end of one of said cables being coupled to a first driving element of a first one of said control mechanisms and the opposite end of the other of said cables being coupled to a second driving element of a second one of said control mechanisms, said first and second driving elements being coupled together.

18. Control mechanism as defined in claim 1 wherein said driving element comprises a first pulley and said driving connection includes a transmission cable between said pulley and stay, and which further includes a second pulley and transmission driving cable thereon, a rotatable spindle on which said first and second pulleys are non-rotatably mounted, the part of said spindle engaged by said first pulley being rounded to permit limited rocking movement thereof relative to said spindle.

19. Control mechanism for operating a window sash or like element mounted pivotally in a frame element, said control mechanism comprising a driving member mounted for rotation, a carriage mounted pivotally for rotation about an axis always coincident with the axis of rotation of said driving member, a stay slidable longitudinally in said carriage and coupled to said driving member for longitudinal movement in accordance with rotation of said driving member, the direction of rotation of said driving member determining the direction of longitudinal movement of said stay, a link member, and a bracket secured to one end of said stay and also secured pivotally to said link, the axis of the pivot connecting said bracket and link coinciding with the pivot axis of said carriage and rotatable driving member only when said stay occupies a fully retracted position corresponding to the closed position of the sash element in its frame element whereby continued rotation of said driving member in the window closing direction will then effect rotation of said carriage and stay as a unit about the pivot axis of said driving member and carriage to bring said stay into a position substantially at a right angle to its direction of longitudinal movement, said link being secured pivotally to one of said window elements and said driving member and carriage being mounted on the other of said window elements.

20. A control mechanism as defined in claim 19 wherein said link is pivotally secured to said window sash at a position thereon remote from the pivot axis of said sash and said drive member and carriage are mounted on said window frame.

21. A control mechanism as defined in claim 19 wherein said link is pivotally secured to said window frame and said drive member and carriage are mounted on said window sash at a side thereof opposite the side at which said window sash is pivotally mounted.

References Cited in the file of this patent

UNITED STATES PATENTS

| | | |
|---|---|---|
| 1,738,742 | Terhune | Dec. 10, 1929 |
| 1,808,207 | Cook | June 2, 1931 |
| 2,314,759 | Bischoff | Mar. 23, 1943 |
| 2,652,245 | Bentley | Sept. 15, 1953 |